United States Patent [19]

Barzee et al.

[11] 4,398,815
[45] Aug. 16, 1983

[54] CAMERA MOUNT

[75] Inventors: Verl N. Barzee, Sunnyvale; Peter J. Wonfor, Cupertino, both of Calif.

[73] Assignee: Ampex Corporation, Redwood City, Calif.

[21] Appl. No.: 405,988

[22] Filed: Aug. 6, 1982

Related U.S. Application Data

[63] Continuation of Ser. No. 313,069, Oct. 19, 1981, abandoned.

[51] Int. Cl.³ ............................................. G03B 17/56
[52] U.S. Cl. ..................................... 354/293; 352/243
[58] Field of Search ........................ 354/293; 358/229; 352/243; 248/648, 680, 681

[56] References Cited

U.S. PATENT DOCUMENTS 3,589,260  6/1971  Ferra .................................... 354/293

FOREIGN PATENT DOCUMENTS 2808788  9/1979  Fed. Rep. of Germany ...... 354/293

Primary Examiner—John Gonzales
Attorney, Agent, or Firm—Joel D. Talcott; Charles M. Carman, Jr.; Robert S. Swecker

[57] ABSTRACT

A camera mount of the type including a front plate having an attachment to the lens-mounting frontal side of a camera-and-lens assembly, and a bottom plate extending rearwardly, parallel to the lens axis, from the lower portion of the front plate for supporting the rearward portion of the camera and for mounting the camera on a base structure, characterized in that means are provided on the bottom plate for engaging and supporting the rearward portion of the camera and for countering the moment exerted by the weight of the camera about its attachment; and means are provided for clamping the camera to the bottom plate and to the supporting means thereof.

4 Claims, 7 Drawing Figures

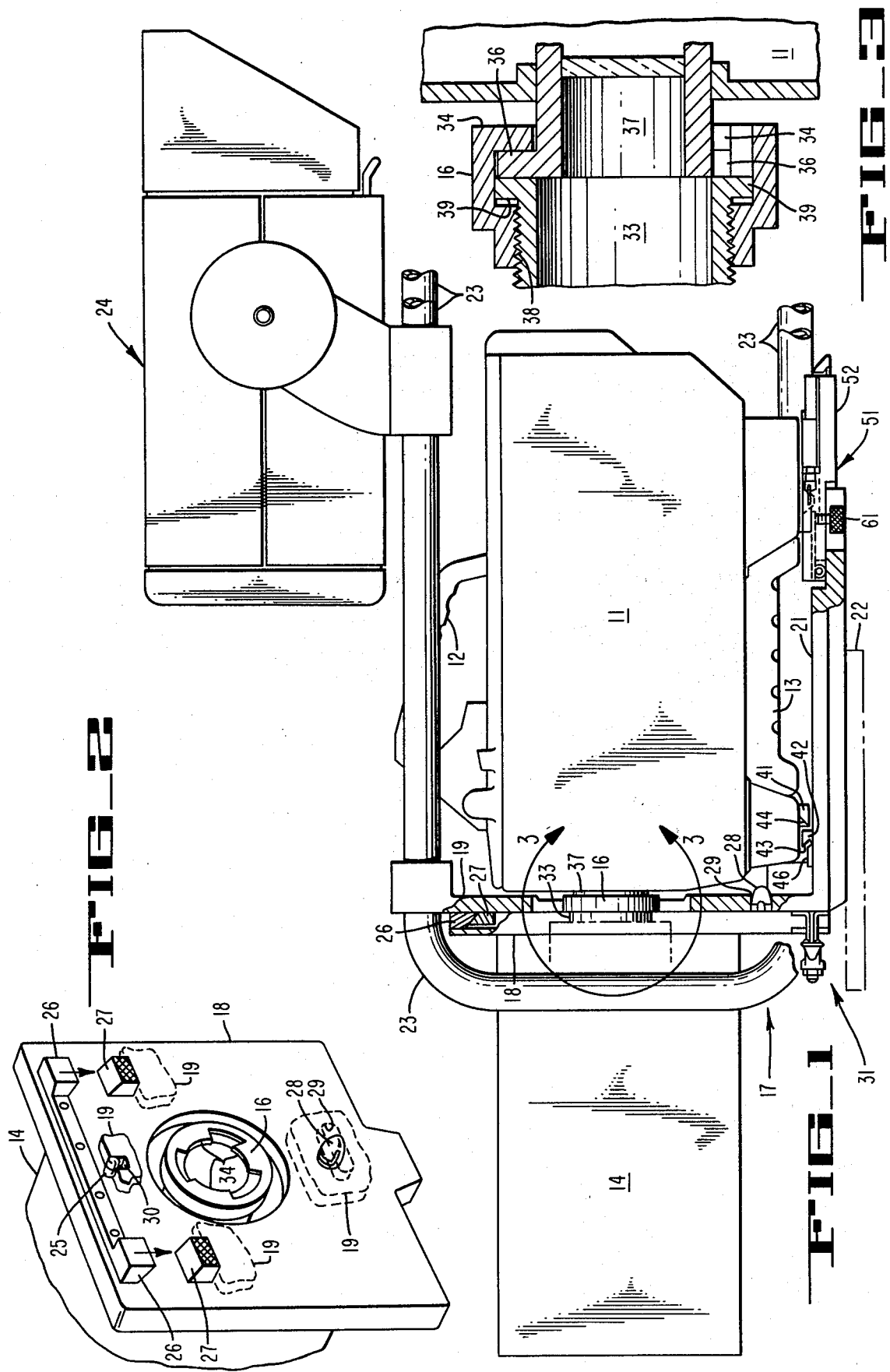

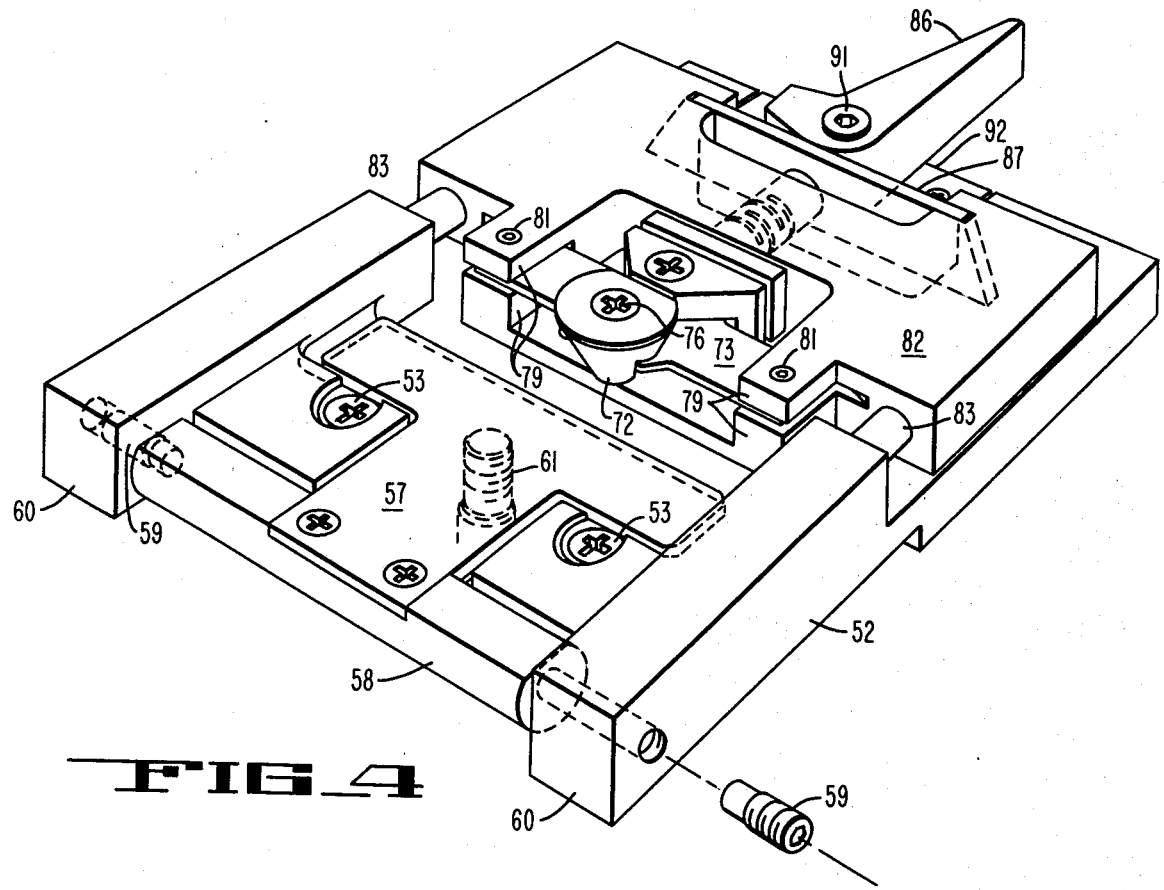
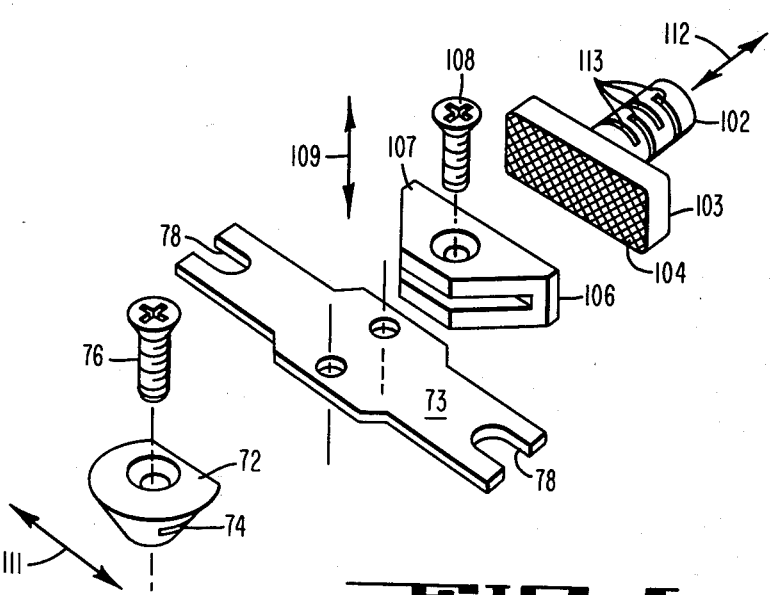

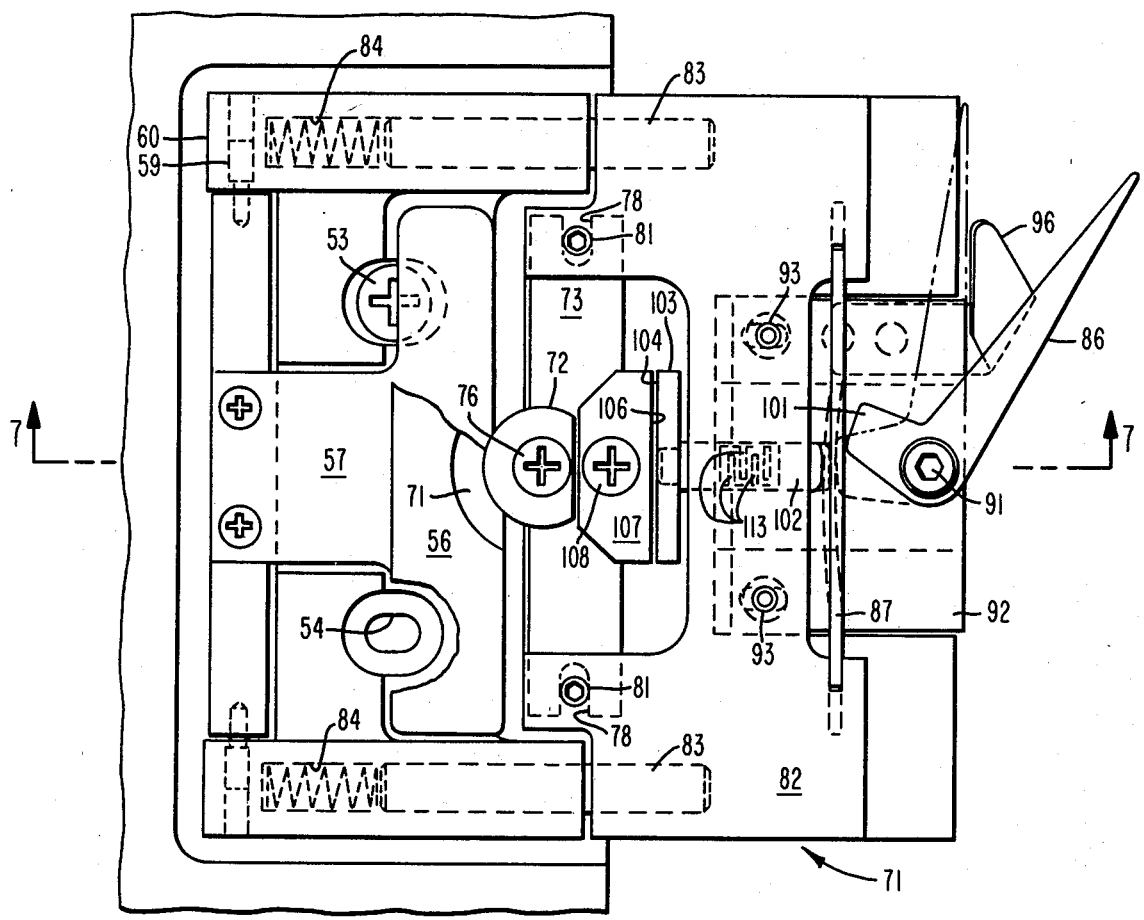
FIG_6
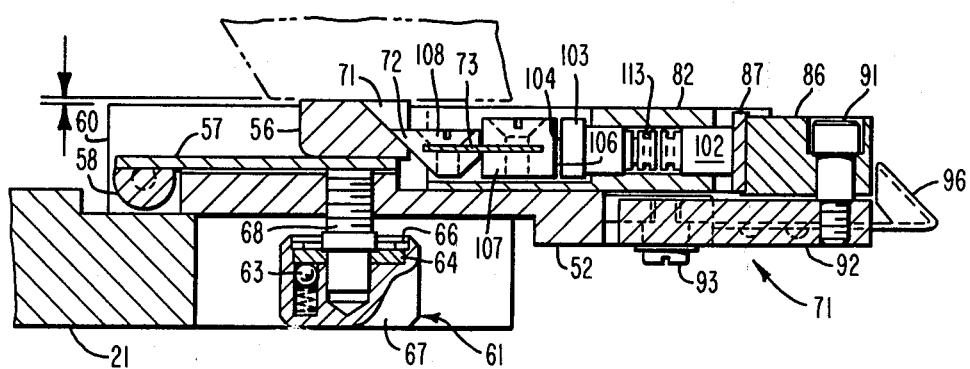
FIG_7

CAMERA MOUNT

This is a continuation, of application Ser. No. 313,069, filed 10/19/81 now abandoned.

BACKGROUND OF THE INVENTION

This invention relates to camera mounts, and particularly to such mounts for adapting field portable cameras to fit on studio mounts and tripod bases.

In the television art, field-portable cameras of lightweight and compact construction are used for news gathering and other field uses, while in the studio, larger more elaborate cameras are mounted on cranes, tripods or heavy wheeled bases. In the interests of flexibility and economy, it has lately become the practice to provide special housings for adapting portable cameras to studio mounts, such housings being arranged, first, to solidly mount the portable camera; second, to carry the more elaborate electronic and other equipment associated with studio cameras; and, third, to attach solidly to the tripod or other studio base required.

A common form of special housing includes or is comprised by a front plate with a bottom plate extending horizontally from the bottom edge of the front plate to support the bottom of the camera and to attach to the studio base. The lens then is attached solidly to the camera, e.g., by means of a bayonet-ring coupling, and extends from the camera through an opening in the front plate, which does not directly support either the camera or the lens.

When very large lenses are to be employed, however, special problems arise. Such large lenses may weigh nearly as much as the portable camera itself. Consequently, the lens assembly tends to sag out of its delicate optical alignment with the camera, and requires separate bracing, usually in the form of cantilever-type extension brackets. The resulting assembly is often awkward, cumbersome, and visually unpleasing.

Accordingly, it is an object of the present invention to provide a studio mount for portable cameras and heavy lens assemblies in which optical alignment of camera and lens is preserved without the need for cantilever extension brackets for the lens;

It is another object of the invention to provide a studio mount for portable cameras in which moments exerted by the camera are precisely countered.

SUMMARY OF THE INVENTION

This and other objects of the invention are attained in the present invention by means of a camera mount of the type including a front plate having an attachment to the lens-mounting frontal side of a camera-and-lens assembly, and a bottom plate extending rearwardly, parallel to the lens axis, from the lower portion of the front plate for supporting the rearward portion of the camera and for mounting the camera on a base structure, characterized in that means are provided on the bottom plate for engaging and supporting the rearward portion of the camera and for countering the moment exerted by the weight of the camera about its attachment; and means are provided for clamping the camera to the bottom plate and to the supporting means thereof.

DESCRIPTION OF THE DRAWINGS

FIG. 1 is an elevation view of a portable camera and heavy lens assembly mounted in a studio mount according to the invention;

FIG. 2 is a perspective view, partly fragmented and in phantom, of a portion of the apparatus shown in FIG. 1;

FIG. 3 is a cross-sectional elevation view, to an enlarged scale, of a portion of the apparatus enclosed in lines 3—3 of FIG. 1;

FIG. 4 is a perspective view, to an enlarged scale, of portions of the apparatus shown in FIG. 1;

FIG. 5 is an exploded perspective view of portions of the apparatus shown in FIG. 4;

FIG. 6 is a plan view, partly in phantom, of the apparatus shown in FIG. 4; and

FIG. 7 is a cross-sectional elevation view taken on the plane of lines 7—7 of FIG. 6.

DESCRIPTION OF THE PREFERRED EMBODIMENTS

Referring now to FIG. 1, there is shown a portable television camera 11 having a carrying handle 12 and shoulder saddle 13. A heavy lens assembly 14 is attached to the camera 11 by means of a coupling including a bayonet ring 16, and the assembly 11–14 is mounted in a studio mount 17 as by means of a lens mounting plate 18 extending from the lens assembly 14 and attached to a front plate 19 of the mount 17. The remainder of the mount 17 includes a bottom plate 21 extending horizontally and rearwardly from the bottom of the front plate 19, portions of a studio base or tripod attachment means 22 extending from the bottom plate, protecting and handling cage grille bars 23 attached to the front and bottom plates, and a viewfinder apparatus 24, attached to the bars 23.

The apparatus so far described is known in the art; including the attachment means 16, 18 and 19, which is described further as follows.

The lens mounting plate 18, see also FIG. 2, has a three-point connection with the mount front plate 19, namely through a pair of upper wedge elements 26 extending from the plate 18 and engaging and locking into corresponding wedge elements 27, which extend from plate 19, and a lower spring-loaded wedge element 28, which projects into an opening 29 in the front plate 19, springily engaging only the upper interior surface of the opening 29. To make certain that full engagement of the mating surfaces of the elements 26, 27 and 19, which are all gauge surfaces, is not inhibited the opening 29 is made substantially wider than the element 28, and precise lateral positioning of the lens plate 18 is provided by means of a positioning pin 25 extending from plate 18 and fitting loosely in a vertical direction, but snugly in a lateral direction, in an upwardly opening slot 30 in the upper portion of front plate 19. A clamp 31, here shown as a double-action pressure clamp of the type CL-150-HTC manufactured by the Carr Lane Co. of St. Louis, Missouri, may be mounted on the lower front portion of the front plate 19 to clamp the lens plate 18 solidly thereto.

As shown in FIGS. 2 and 3, the bayonet ring 16 is rotatably threaded onto a tubular portion 33 of the lens assembly 14, and presents three circumferentially equispaced bayonet lugs 34 each of slightly less than 60 degrees arcuate dimension, between which may be passed a similar trio of lugs 36 extending from a tubular portion 37 of the camera 11. The ring 16 may then be rotated about 60 degrees on its threads 38 to bring the lugs 34 into circumferential locking registration with the lugs 36, and to concurrently snug the lugs 36 tightly against an end flange of the lens tube 33. In FIG. 2 the lugs 34 are shown in the open (unlocked) position, and in FIG. 3 they are shown in the rotated (locked) position.

Also shown in FIG. 1 is a pair of wedge elements 41, 42, which may be used to retain the front portion of the camera 11 when a smaller lens is to be used and when, in consequence, it is not necessary to employ the lens plate 18 or its coupling to the front plate 19. For such use, the wedge element 42, on the plate 21, is pivoted 180 degrees horizontally to cause its wedge face 43 to face rearwardly, and the forwardly facing wedge face 44 of element 41 can then engage face 43, with the flat bottom of the element 41 supporting the weight of the front portion of the camera upon a plateau 46 formed on the element 42.

To support the rearward portion of the camera, whether element 42 is used or plate 18, the present invention contemplates a structure 51, also shown in FIGS. 4–7, for precisely countering the vertically downward rotational moment of the camera.

Upon the rearward portion of plate 21 is secured a frame member 52, as by bolts or machine screws 53, which pass through openings 54 in member 52, the openings 54 being elongated in a forward-rearward direction to permit later positional adjustment. A shoe 56 extends downwardly from camara 11 and rests upon a pressure distributing plate 57, which in turn is pivoted on a shaft 58 journalled on set-screw pins 59 between two arms 60 of the frame 52. To support the plate 57, a torque screw 61 is threaded upwardly through frame 52 to engage the plate 57 beneath shoe 56. The torque screw 61 shown is of a type TS-30 manufactured by Ace Drill Co. of Newark, N.J. and has an end pressure of 18–22 pounds, described as the maximum pressure that may be supported by the upper end of the screw while the screw retains its ability to turn in the threads of the screw hole. When this pressure is exceeded, a spring-loaded detent ball 63 slips out of a small recess in a metal bearing plate 64 which is retained by a retaining ring 66 inside the screw's manually rotatable knob 67, permitting the knob to turn freely with respect to the threaded screw body 68.

Thus, to counter the moment of the camera-lens assembly, it is merely necessary to turn the knob 67 until it begins to turn freely around the screw body 68, the end-pressure characteristic of the torque screw having been selected to precisely counter-balance that moment.

To assist in clamping the shoe member 56 to the plate 57, the shoe is formed with an upward and rearwardly opening conical recess 71, the vertical axis of which lies outside the body of the shoe, and a floating conical detent member 72 is arranged to seek and seat itself in the recess 71. The conical member 72 is mounted on a leaf spring member 73 as by means of a slot 74 (FIG. 5) formed in the member 72 for the leaf 73, and a screw 76 passing through the upper portion of the conical member 72 and the leaf 73 and threaded into the lower portion of member 72. The leaf 73 has elongated end slots 78 by which the leaf may be mounted for lateral sliding motion between brackets 79 as by means of bolts 81, while vertical seeking and seating motion of the conical detent 72 is permitted by the flexibility of spring leaf 73. The brackets 79 form part of a forward-rearward slider member 82, from which extend a pair of forwardly directed slider rods 83, which slide in bores 84 of member 52, the rods being springloaded for rearward (retracting) movement, and being urged forwardly to seat the conical detent 72 as by means of a bell-crank toggle handle 86, which in closed position (phantom, FIG. 6) bears against a spring leaf 87 mounted at the ends in slots in member 82. The ends of leaf 87 have a trapezoidal inclination, so as to assure retention of the leaf in its slots in member 82 when inserted from below. The handle 86 is separately mounted, being pivoted by a bolt 91 to a plate 92 that is (forwardly-rearwardly) adjustably mounted on frame 52 by means of bolts 93. A spring clip 96 extends from plate 92 to secure the handle 86 in closed position; the clip end may be manually depressed to release the handle.

To move the conical member 72 forwardly for seeking and seating in the conical recess 71 of the camera, the forward end 101 of the crank 86 transmits force through the spring leaf 87 to the end of a sliding shaft 102, on the forward end of which is mounted a friction plate 103. The plate 103 has a roughened forward surface 104 confronting and engaging a similar surface 106 formed on a friction element 107, which in turn is mounted on the spring leaf 73 by means of a bolt 108. Thus, while the conical element 72 is moving forwardly but has not yet seated firmly in the conical recess 71, the conical element 72 has freedom for seeking and seating motion in upward-downward directions 109 (FIG. 5) and in horizontal lateral directions 111, all orthogonal to the forward-backward seating and retracting directions 112 in which it is moved by the crank 86 or springs 84; but when the conical element 72 reaches its final seating position in the conical recess 71, the friction elements 103, 107 become locked in pressurized frictional engagement and cannot easily be shifted laterally with respect to one another. The shaft 102 is provided with lateral saw cuts 113 from alternating sides so as to springly apply the needed pressure to the friction elements 103, 107. The shaft 102 may be secured) e.g. magnetically to the leaf 87, or otherwise spring loaded for retraction when released by the crank 86.

It will be understood that the conical element 72 will usually seat in the recess 71 so as to be engaged therewith only tangentially, i.e., along substantially only a single generatrix of the member 72 and a single generatrix of the surface 71, for as the member 72 rises with respect to the surface 71, each portion of the element, which has a given radius of curvature, encounters portions of the surface 71 of greater and greater radius of curvature. This essentially linear contact between the two elements is useful in permitting play of the element 72 in its seeking and seating movements.

What has been described is a camera mount of the type including a front plate having an attachment to the lens-mounting frontal side of a camera-and-lens assembly, and a bottom plate extending rearwardly, parallel to the lens axis, from the lower portion of the front plate for supporting the rearward portion of the camera and for mounting the camera on a base structure, characterized in that means are provided on the bottom plate for engaging and supporting the rearward portion of the camera and for countering the moment exerted by the weight of the camera about its attachment; and means are provided for clamping the camera to the bottom plate and to the supporting means thereof.

What is claimed is:

1. A camera mount of the type including a front plate for attaching a camera-lens assembly, the front portion of said camera having an attachment to said lens in the vicinity of said plate for supporting said front camera portion, and a bottom plate extending rearwardly, parallel to the lens axis, from the lower portion of the front plate for supporting the rearward portion of the camera and for mounting the camera on a base structure, characterized in that:

means are provided on said bottom plate for engaging and supporting said rearward portion of said camera and for countering the moment exerted by the weight of the camera about said attachment thereof said supporting means includes an adjustable pressurizing means that is automatically self-limiting for exerting a predetermined maximum supporting force upwardly on said camera to counter said moment; and means are provided for clamping said camera and lens assembly to said bottom plate and to said supporting means thereof.

2. A camera mount as described in claim 1, and further characterized in that:

a pressure-distributing plate is mounted for vertical pivoting motion on said supporting means with said plate extending from a pivot portion thereof to and between said pressurizing means and said camera for distributing said predetermined supporting force across a zone of the bottom rearward portion of said camera.

3. A camera mount as described and characterized in claim 2, wherein said pressurizing means includes a torque screw means threaded upwardly through said supporting means and engaging the bottom of said pressure-distributing plate, said torque-screw means also including a manually turnable portion and a spring-loaded frictional coupling operating to couple the manually turnable portion and the pressure-distributing plate engaging portion only when the camera supporting force is less than said predetermined maximum supporting force.

4. A camera mount as described and characterized in claim 1, wherein:

said camera has a clamping shoe on the bottom rearward portion thereof, said shoe in part defining a recess with an upwardly opening conical concave surface of vertical axis lying outside the body of said shoe;

said clamping means include a conical detent member mounted for reciprocating movement in first directions parallel to said lens axis and toward and away from said conical recess, and in second directions orthogonal to said first directions, for seeking and seating in linear clamping contact within said conical recess; and means are provided for locking said conical detent member against said second orthogonal and first direction movements thereof in a clamping position of said detent member.

* * * * *